(12) United States Patent
Kobayashi

(10) Patent No.: US 7,916,596 B2
(45) Date of Patent: Mar. 29, 2011

(54) OPTICAL DISC DEVICE, CONTROL METHOD THEREOF, AND COMPUTER-READABLE RECORDING MEDIUM

(75) Inventor: Toshikazu Kobayashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 602 days.

(21) Appl. No.: 11/782,066

(22) Filed: Jul. 24, 2007

(65) Prior Publication Data

US 2008/0025176 A1 Jan. 31, 2008

(30) Foreign Application Priority Data

Jul. 26, 2006 (JP) ................. 2006-203063

(51) Int. Cl.
*G11B 7/00* (2006.01)
(52) U.S. Cl. .................. 369/53.22; 369/53.42
(58) Field of Classification Search ........... 369/53.42
See application file for complete search history.

(56) References Cited

U.S. PATENT DOCUMENTS

| | | | |
|---|---|---|---|
| 6,061,318 A | 5/2000 | Hwang | |
| 7,145,842 B2 | 12/2006 | Kobayashi | |
| 7,145,854 B2 | 12/2006 | Kobayashi | |
| 7,203,148 B2 | 4/2007 | Kim et al. | |
| 2003/0012106 A1 | 1/2003 | Kobayashi | |
| 2003/0086347 A1* | 5/2003 | Kobayashi | 369/53.22 |
| 2003/0202444 A1 | 10/2003 | Kim et al. | |
| 2004/0100890 A1* | 5/2004 | Lee | 369/53.23 |
| 2005/0105433 A1* | 5/2005 | Juan et al. | 369/53.23 |
| 2007/0274173 A1* | 11/2007 | Saitoh et al. | 369/44.35 |

FOREIGN PATENT DOCUMENTS

| | | |
|---|---|---|
| JP | 11-149640 | 6/1999 |
| JP | 11288550 | 10/1999 |
| JP | 2986587 | 12/1999 |
| JP | 2000260109 | 9/2000 |
| JP | 2002269770 | 9/2002 |
| JP | 2002367193 | 12/2002 |
| JP | 2003091835 | 3/2003 |
| JP | 2003323716 | 11/2003 |
| JP | 2006059424 | 3/2006 |
| KR | 2003-005335 | 1/2003 |
| KR | 2003-0085416 | 11/2003 |

OTHER PUBLICATIONS

Partial Translation of Notice of Rejection dated Apr. 22, 2008, for corresponding Japanese Patent Application No. 2006-203063.
European Search Report dated Jan. 20, 2009, from the corresponding European Application.
Korean Notice of Preliminary Rejection dated Nov. 26, 2008, from the corresponding Korean Application.

* cited by examiner

*Primary Examiner* — Lixi Chow
(74) *Attorney, Agent, or Firm* — Katten Muchin Rosenman LLP

(57) ABSTRACT

Provided is an optical disc device for reading a signal recorded on an optical disc medium, which detects surface reflection at a surface of the optical disc medium, a fake signal generated based on the surface reflection, and light reflected by a data recording layer of the optical disc medium while an objective lens is moved relative to the surface of the optical disc medium, and discriminates a type of the optical disc medium based on a ratio of a first time period between an instant when the surface reflection is detected and an instant when the fake signal is detected, and a second time period between the instant when the surface reflection is detected and an instant when light reflected by the data recording layer is detected.

3 Claims, 7 Drawing Sheets

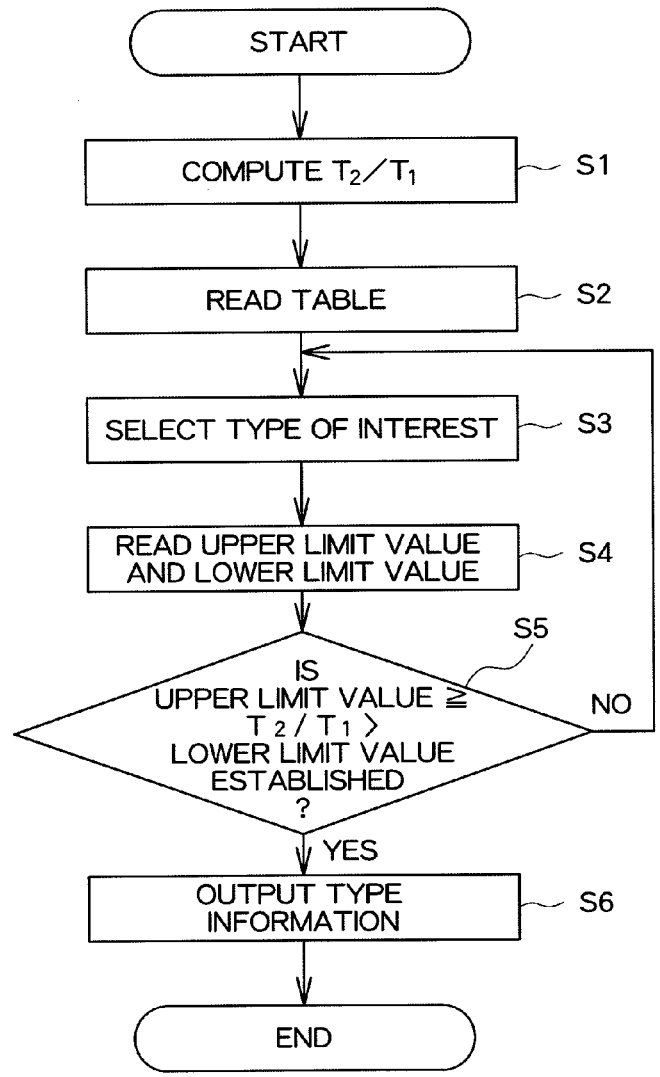

OPTICAL DISC DEVICE, CONTROL METHOD THEREOF, AND COMPUTER-READABLE RECORDING MEDIUM

CROSS-REFERENCE TO RELATED APPLICATIONS

The priority application Number JP 2006-203063 upon which this patent application is based is hereby incorporated by reference.

BACKGROUND OF THE INVENTION

1. Field of the Invention

The present invention relates to an optical disc device including CD-ROMs, CD-Rs, CD-RWs, DVDs, and Blu-ray (Trademark) Disc drives, a control method thereof, and a computer-readable recording medium.

2. Description of the Related Art

Recently, a wide variety of optical disc media have been developed and flexibly used according to intended use. In general, the optical disc media have a multi-layer structure. For example, a protective layer is formed on both sides of a medium and a data recording layer is sandwiched between those protective layers.

However, the optical disc media differ from one another in many parameters such as thickness of an optical disc medium itself, a distance between a surface of the protective layer and a surface (signal surface) of the data recording layer, the number of signal surfaces, and wavelength of a laser beam to be used for reading information from the signal surface. For example, a DVD has the signal surfaces on two layers at maximum.

Under the above-mentioned circumstances, a drive dedicated to each type of optical disc media is generally used. However, when it is necessary for a user to purchase and install the drive dedicated to each type of disc media, the user is required to master the operation of the respective drives, and an economical burden on the user is large. There has therefore been demand for a drive (optical disc device) which can be used for multiple types of media.

For a drive which can be used for multiple types of media, technology for changing a numerical aperture of a lens with a single objective lens using an optical device having a wavelength selection characteristic has been developed. The technology utilizes the fact that the wavelength of a light source (laser) used for reading differs for each type of media.

As shown in FIG. 7, an optical pickup 1 for the drive includes a light emitting element 11 for outputting laser beams having a plurality of wavelengths, a beam splitter 12, a photodetector 13, and an objective lens body 14. The objective lens body 14 includes an objective lens 14L and a hologram element 14H including a diffraction grating.

The light emitting element 11 is, for example, a semiconductor laser element (a so-called "three-wavelength laser") which outputs laser beams having three different wavelengths. The three wavelengths are 405 nm for a Blu-ray Disc (Trademark), 650 nm for a digital versatile disc (DVD), and 780 nm for a compact disc (CD).

The beam splitter 12 guides light from the light emitting element 11 toward the objective lens body 14 side. Further, the beam splitter 12 also guides light reflected by the medium and input through the objective lens body 14 toward the photodetector 13 side. The photodetector 13 includes, for example, a plurality of light detecting elements arranged in a matrix of N×N. This photodetector 13 includes, for example, a cylindrical lens for measuring a diameter of a beam. Light guided by the beam splitter 12 reaches the plurality of light receiving elements through the cylindrical lens. Then, the photodetector 13 outputs signals corresponding to light intensities detected by the plurality of light receiving elements.

The hologram element 14H of the objective lens body 14 receives a laser beam reflected by the medium through the objective lens body 14. The hologram element 14H diffracts the received light to obtain a predetermined numerical aperture (NA) for each wavelength and guides the diffracted light to the beam splitter 12. The objective lens 14L is an aspherical lens which refracts a laser beam guided from the light emitting element 11 through the beam splitter 12 and the hologram element 14H to focus the laser beam at a position at a predetermined focal length F from the objective lens 14L, where the focal length F differs for each wavelength and output the laser beam. The objective lens 14L converges a laser beam reflected by the medium and guides it to the hologram element 14H.

This optical pickup 1 can move in a direction substantially perpendicular to the surface of the optical disc medium and the focus is controlled to be set on the signal surface of the optical disc medium before a signal is read from the optical disc medium. That is, a signal (focus error signal; FE signal) indicative of the shift of the focus of a laser beam from the recording surface of the optical disc medium, and a signal (pull-in signal; PI signal) indicative of the sum of the intensities of light reaching the light receiving elements are generated from a signal (RF signal) output from the photodetector 13. A signal (TE signal) indicative of a tracking error is usually generated from the signal output from the photodetector 13. A detailed description thereof is omitted.

The FE signal is a signal as shown in FIG. 8A. That is, the FE signal becomes substantially "0" when the signal surface is in focus. When a distance between the optical disc medium and the objective lens body 14 is changed with a focusing position as the center thereof and the objective lens body 14 moves a predetermined distance away from the focusing position, the signal has peaks on a positive side and on a negative side. This signal waveform will be referred to as a "focus error waveform" hereinafter.

The PI signal is a signal as shown in FIG. 8B. That is, this PI signal has a peak at the focusing position. FIGS. 8A and 8B are explanatory diagrams schematically showing the FE signal and the PI signal, respectively.

When the optical pickup 1 is used, the following control becomes possible. That is, a distance between the objective lens body 14 and the surface of the optical disc medium can be controlled so that a distance between a plane portion P of the objective lens 14L and the signal surface inside the medium becomes the above-mentioned focal length F, that is, so that the signal surface is brought into focus. Thus, a signal can be read from a plurality of optical disc media.

In this case, it may be judged whether the signal surface is in focus or not by using the above-mentioned FE signal and/or the PI signal. For example, it may be judged that the signal surface is in focus when the absolute value of the FE signal exceeds a peak and then falls below a predetermined threshold value (close to "0"). Alternatively, it may be judged that the signal surface is in focus when the PI signal exceeds a predetermined threshold value.

In the optical disc device using the above-mentioned optical pickup 1, before data recorded on the optical disc medium is accessed, the type of the optical disc medium is determined.

For this reason, a technique of measuring the distance from the surface of the optical disc medium to the recording surface by using a focus error signal to determine the type of optical disc medium has been developed (Japanese Patent No. 2,986,587, etc.).

However, with the diversification of optical disc media, there are types of optical disc media of which distances between the surfaces and recording surfaces are close to each other. For example, in addition to a CD and a DVD, an optical disc medium called "dual disc" which is manufactured by assembling a CD and a DVD together is available on the market.

Since a protective layer of a CD has a thickness of about 1.2 mm and that of a DVD has a thickness of about 0.6 mm, in order to discriminate only a CD and a DVD from each other, by setting the threshold value to, for example, 1.0 mm, the optical medium is determined as a DVD when an image is formed on the signal surface at a distance of less than the threshold value from the surface, and as a CD when an image is not formed at the above-mentioned distance.

However, since the protective layer of a dual disc has a thickness of 0.9 mm, in order to handle the optical disc medium, the threshold value for a CD must be set to a value between 0.9 mm and 1.2 mm and the threshold value for a DVD must be set to a value between 0.6 mm and 0.9 mm.

In general, a feed rate of an actuator for moving the objective lens of the optical pickup relative to the surface of the optical disc may change according to environmental factors such as temperature. In consideration of the change in feed rate, it is not realistic to set the threshold value to a value of around 0.3 mm. Thus, depending on the type of optical disc, it is difficult to discriminate the type of a DVD, a CD, or a dual disc under the current circumstances.

SUMMARY OF THE INVENTION

It is one of objects of the present invention to provide an optical disc device capable of enhancing the accuracy of discrimination between optical disc media whose difference in thickness from the surface to the recording layer is relatively small.

In order to solve the above-mentioned problems inherent in the related art, the present invention provides an optical disc device for reading a signal recorded on an optical disc medium, including: an optical pickup which selectively applies light having one wavelength, out of a plurality of different wavelengths, to the optical disc medium through one objective lens, and which outputs a signal based on light reflected by the optical disc medium; a drive unit which moves the objective lens of the optical pickup relative to a surface of the optical disc medium; and a control unit which detects a signal based on surface reflection by the surface of the optical disc medium, a fake signal generated based on the surface reflection, and a signal based on light reflected by a data recording layer of the optical disc medium, while the objective lens is moved relative to the surface of the optical disc medium by the drive unit, and which discriminates a type of the optical disc medium based on a ratio of a first time period and a second time period, where the first time period is the time between an instant when the surface reflection is detected and an instant when the fake signal is detected, and where the second time period is the time between the instant when the surface reflection is detected and an instant when light reflected by the data recording layer is detected.

BRIEF DESCRIPTION OF THE DRAWINGS

In the accompanying drawings:

FIG. 4 is an explanatory diagram showing an example of a table showing criteria used by the optical disc device according to the embodiment of the present invention;

FIG. 5 is a flow chart showing an example of determination processing of the optical disc device according to the embodiment of the present invention;

DESCRIPTION OF THE PREFERRED EMBODIMENT

Figure 1:
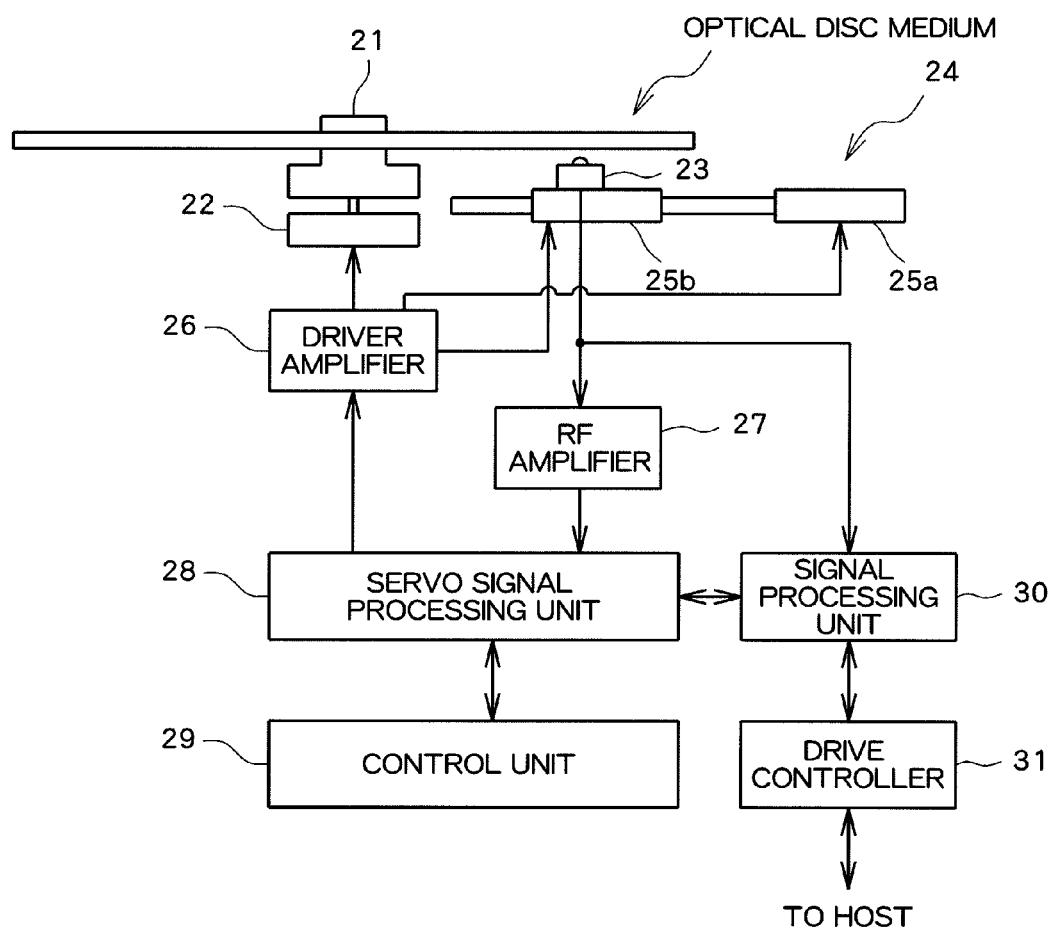
FIG. 1 is a block diagram showing a structure of an optical disc device according to an embodiment of the present invention.

An embodiment of the present invention will be described with reference to the accompanying drawings. The optical disc device according to the embodiment of the present invention includes a medium support unit 21, a spindle motor 22, an optical pickup 23, a biaxial actuator 24, a feed motor 25a, a focus control actuator 25b, a driver amplifier 26, an RF amplifier 27, a servo signal processing unit 28, a control unit 29, a signal processing unit 30, and a drive controller 31, as shown in FIG. 1.

Figure 7:
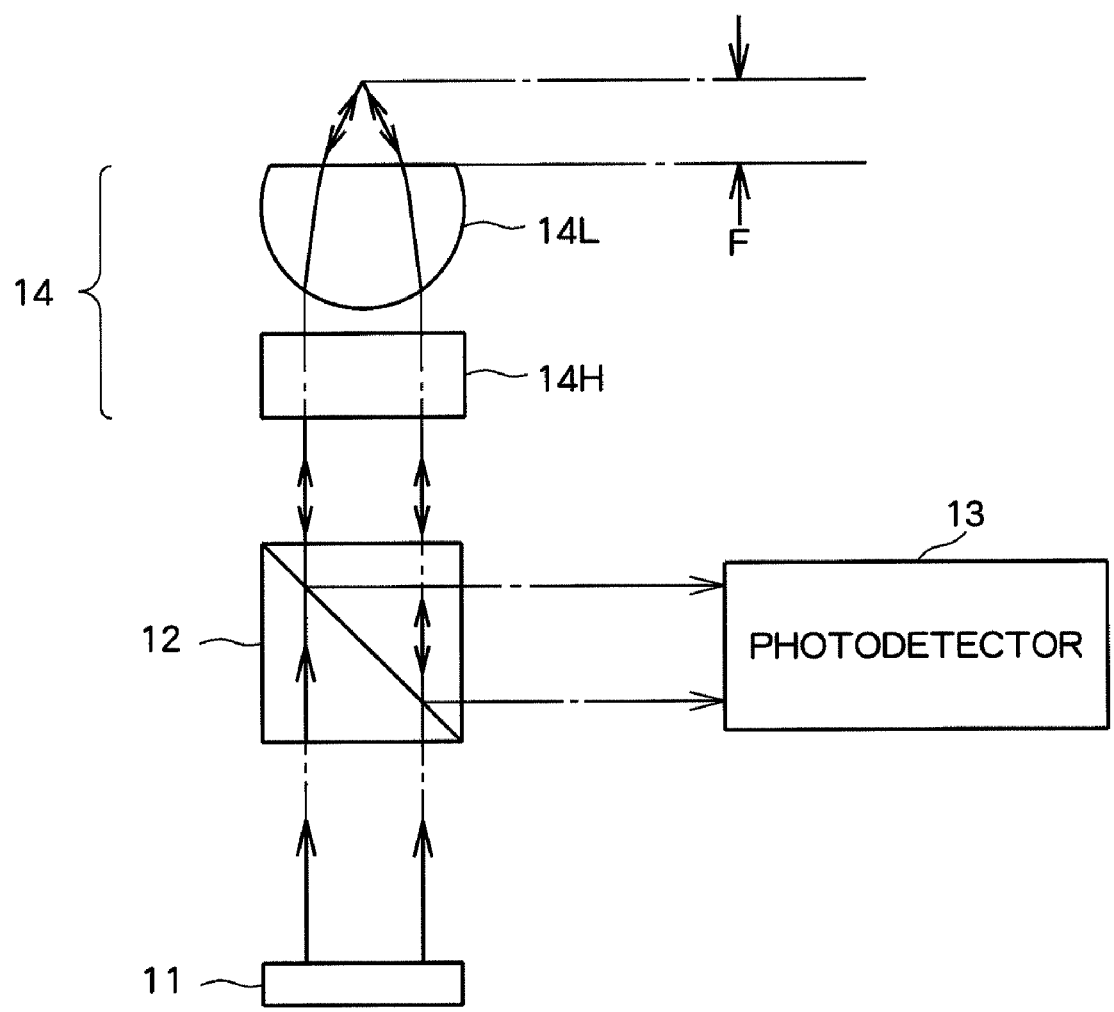
FIG. 7 is a diagram schematically showing a structure of a general optical pickup.
Figure 8A:
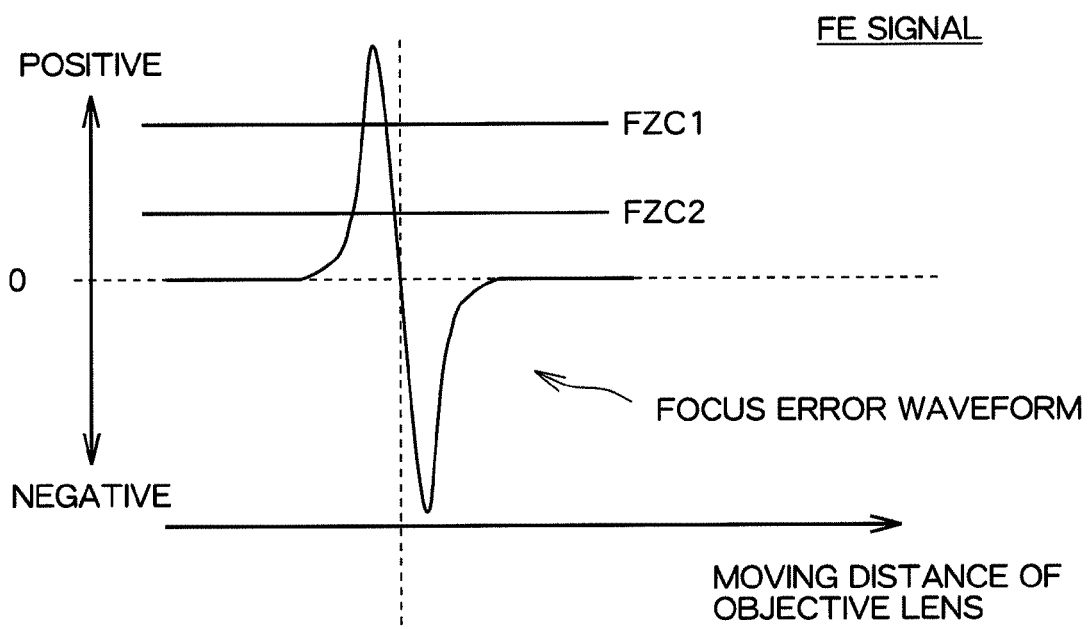
FIG. 8A is an explanatory diagram showing a focus error signal in the vicinity of a focusing position and FIG. 8B is an explanatory diagram showing a pull-in signal in the vicinity of the focusing position.
Figure 8B:
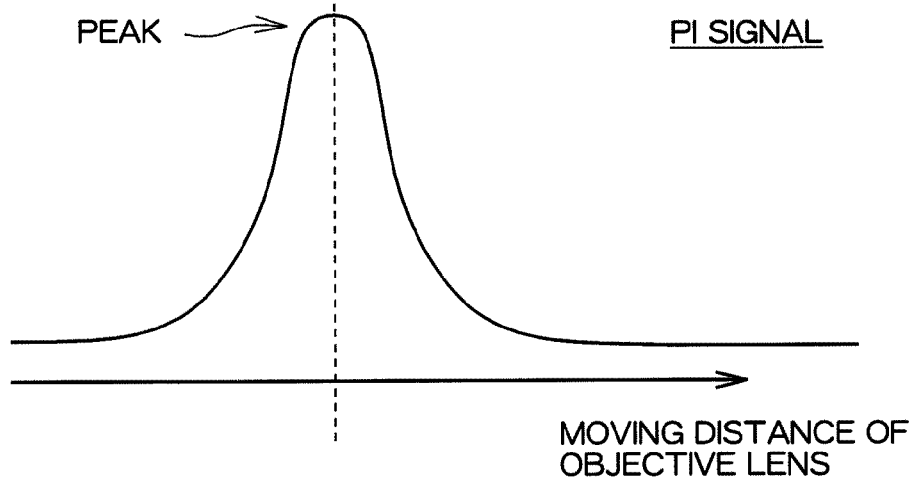

The medium support unit 21 rotatably supports an optical disc medium. The medium support unit 21 spins the optical disc medium using power transmitted from the spindle motor 22. The optical pickup 23 is identical to the optical pickup shown in FIG. 7 and can be moved in two directions (biaxially), i.e., a radial direction of the optical disc medium and a direction perpendicular to the surface of the optical disc medium by the biaxial actuator 24.

The biaxial actuator 24 includes the feed motor 25a and the actuator (focus control actuator) 25b for moving the optical pickup 23 in the direction perpendicular to the surface of the optical disc medium. The focus control actuator 25b is moved in the radial direction of the optical disc medium by the feed motor 25a. A distance between the objective lens body 14 housed in the optical pickup 23 and the surface of the optical disc medium is controlled by the focus control actuator 25b.

The driver amplifier 26 controls the amount of rotation of the feed motor 25a. The driver amplifier 26 drives the focus control actuator 25b in the biaxial actuator 24 in accordance with a signal input from the servo signal processing unit 28.

The RF amplifier 27 outputs at least one of the FE signal and the PI signal based on the output signals of a plurality of light detection elements, which are output from the optical pickup 23. The servo signal processing unit 28 may be composed of a digital signal processor (DSP) and detects the peak of the PI signal output from the RF amplifier 27. The servo signal processing unit 28 also detects whether the peak exceeds the predetermined threshold value (FOK; Focus OK) of the PI signal. Further, the servo signal processing unit 28 carries out predetermined processing using the predetermined threshold value (FZC; Focus Zero Cross) of the FE signal from the RF amplifier 27. This processing will be described in detail hereinafter. The servo signal processing unit 28 outputs the results of those detections and the result of the predetermined processing to the control unit 29.

Further, the servo signal processing unit 28 outputs a signal related to the drive of the focus control actuator to the driver amplifier 26 in accordance with an instruction input from the control unit 29. The control unit 29 is, for example, a microcomputer which includes an execution module and a memory element. The memory element of the control unit 29 is a recording medium which stores programs to be executed and various parameters and can be read by a computer. The execution modules of the control unit 29 carry out processing in accordance with programs stored in the memory element.

This control unit 29 receives inputs of signals or the like (a signal related to the result of the peak detection of the PI signal and a signal indicative of the result of processing of the FE signal) input from the servo signal processing unit 28, and executes processing (focus control processing) for setting the distance between the optical pickup 23 and the optical disc medium to a position where the signal surface is in focus based on these signals. The focus control processing will be described in detail hereinafter.

Further, when power is turned on or a new optical disc medium is put onto the medium support unit 21, the control unit 29 of this embodiment executes processing for discriminating the type of the optical disc medium in cooperation with the servo signal processing unit 28. The contents of this processing will be described hereinafter.

The signal processing unit 30 demodulates a signal recorded on the optical disc medium based on a signal output from the servo signal processing unit 28. The signal processing unit 30 outputs this demodulated signal.

The drive controller 31 is connected to a personal computer, a home game machine body, a video decoder, or the like, as a host, drives the driver amplifier 26 through the control unit 29 in accordance with a request from the host, and moves the optical pickup 23 to a predetermined position above the optical disc medium. The drive controller 31 outputs a signal which is demodulated from a signal recorded on the optical disc medium and output from the signal processing unit 30, to the host side.

The processing for discriminating the type of an optical disc medium by the servo signal processing unit 28 and the control unit 29 will be described hereinunder. In this embodiment, the processing for discriminating the type of the optical disc medium by the servo signal processing unit 28 and the control unit 29 is carried out using software.

Figure 2:
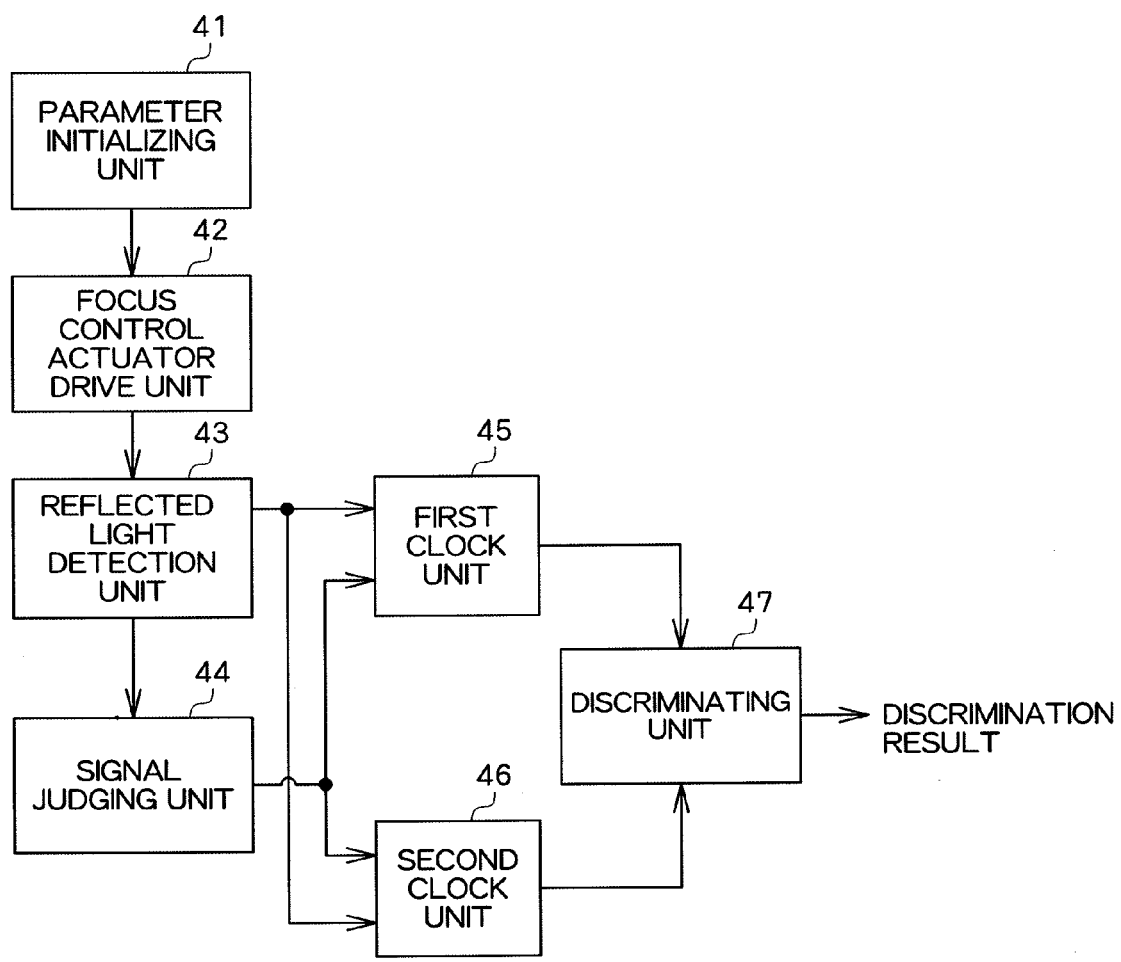
FIG. 2 is a functional block diagram showing an example of the optical disc device according to the embodiment of the present invention.

As a specific example, the optical disc device of this embodiment functions as an apparatus having a structure as shown in FIG. 2 by the operations of the servo signal processing unit 28 and the control unit 29. That is, the optical disc device of this embodiment includes a parameter initializing unit 41, a focus control actuator drive unit 42, a reflected light detection unit 43, a signal judging unit 44, a first clock unit 45, a second clock unit 46, and a discriminating unit 47.

The parameter initializing unit 41 sets the wavelength of light applied by the optical pickup 23 to a predetermined initial value. The parameter initializing unit 41 drives the focus control actuator 25b to move the optical pickup 23 to a position farthest away from the surface of the optical disc medium. The parameter initializing unit 41 outputs a processing start signal to the focus control actuator drive unit 42 when the initializing processing ends.

Upon receipt of the processing start signal, the focus control actuator drive unit 42 moves the optical pickup 23 in a direction approaching the optical disc medium at a predetermined speed.

Figure 3A:
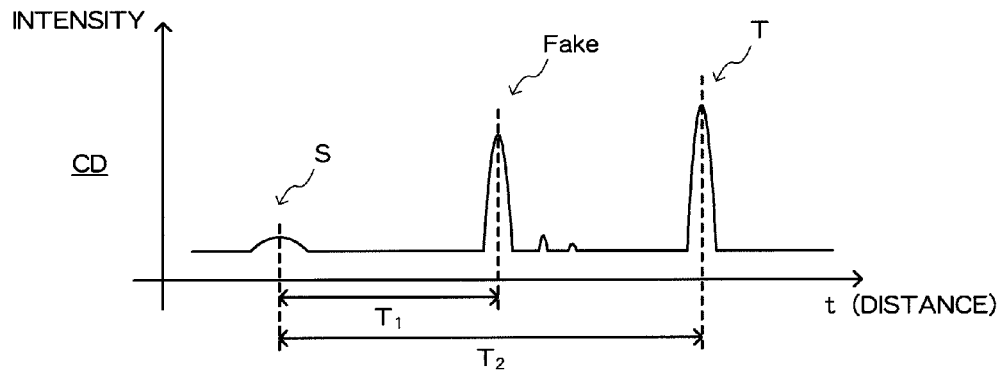
FIG. 3A is an explanatory diagram showing an example of a PI signal for a CD detected by the optical disc device according to the embodiment of the present invention.

The reflected light detection unit 43 detects a peak of the pull-in signal (PI signal) from the optical pickup 23 along with the movement of the optical pickup 23. As for the PI signal, as the optical pickup 23 approaches the surface of the optical disc medium as shown in FIG. 3A which shows a case of a compact disc (CD), light applied by the optical pickup 23 reaches the focusing position on the surface of the optical disc medium and is made incident on the optical pickup 23 as surface reflected light.

In this case, the PI signal output from the optical pickup 23 curves with a peak. As a result, light reflected by the surface of the optical disc medium is detected (surface reflection (S)). When the optical pickup 23 is brought closer to the surface of the optical disc medium, at least one fake signal of unwanted light formed by surface reflection in the optical pickup 23 (not reflection by the recording layer) is detected. At a position where the optical pickup 23 further approaches the optical disc medium, light reflected (T) on the signal surface is detected by the optical pickup 23.

In this embodiment, the measurement accuracy of the position of light reflected by the signal surface is improved based on an appearance position of a signal which appears with high reproducibility when the position of the optical pickup 23 relative to the surface of the optical disc medium is close to a predetermined position irrespective of the difference in type of the optical disc medium. A primary fake signal which is first detected at a position relatively close to surface reflection and has a relatively high level is used as the above-mentioned signal.

The reflected light detection unit 43 detects surface reflection by the optical disc medium based on a change in the PI signal and outputs a surface reflection detection signal when surface reflection is detected.

The signal judging unit 44 detects a fake signal based on a change in the PI signal and outputs a first clock signal to the first clock unit 45 when the fake signal is detected. Though a plurality of fake signals appear in general, the first clock signal may be output when a peak of the PI signal having a strength higher than a predetermined threshold value is first detected.

The signal judging unit 44 detects light reflected by the signal surface based on a change in the PI signal after the first clock signal is output. Upon detection of light reflected by the signal surface, the signal judging unit 44 outputs a second clock signal to the second clock unit 46. The signal judging unit 44 may not detect the peak of the PI signal for a predetermined time (hereinafter referred to as no-detection-period) from the time when the fake signal is detected.

The predetermined time period (no-detection-period) may be a time obtained by multiplying a predetermined constant by first time period information output from the first clock unit 45. In this case, a peak of the PI signal accompanied by reflection by the signal surface is detected after the above-mentioned predetermined time period has passed from the instant when the fake signal is detected, thereby making it possible to prevent erroneous detection of some of a plurality of fake signals as reflection by the signal surface.

The no-detection-period during which the signal judging unit 44 does not detect a peak of the PI signal may be specified as a time period during which the distance between the objective lens of the optical pickup 23 and the optical disc medium falls within a predetermined distance range. In this case, a time period during which the signal judging unit 44 detects a peak of the PI signal (hereinafter referred to as detection-period) is specified as a time during which the distance between the objective lens of the optical pickup 23 and the optical disc medium falls within the predetermined distance range (from Pmask to Plimit (Plimit>Pmask)). Tmask and Tlimit are calculated from the distance range and the position Pfake specified as the position where the fake signal appears, and the signal judging unit 44 may detect a peak of the PI signal during a time period (detection-period) from Tmask to Tlimit.

$$Tmask = Tfake1 \times Pmask/Pfake1$$

$$Tlimit = Tfake1 \times Plimit/Pfake1$$

The first clock unit 45 is a timer which starts a clock from the instant when a surface reflection detection signal is input, terminates the clock at the instant when a first clock signal is input, and outputs time information (first time period information) to the discriminating unit 47 at the instant when the clock ends. The second clock unit 46 is also a timer which starts a clock from the instant when a surface reflection detection signal is input, terminates the clock at the instant when a second clock signal is input, and outputs time information (second time period information) to the discriminating unit 47 at the instant when the clock ends.

The discriminating unit 47 carries out processing for discriminating the type of optical disc medium based on the first time period information output from the first clock unit 45 and the second time period information output from the second clock unit 46. As a specific example, in this embodiment, a table showing a range (lower limit and upper limit) of a T2/T1 ratio of the second time period information T2 to the first time period information T1 for each type of optical disc medium is stored in the memory unit of the control unit 29, as shown in FIG. 4.

As shown in FIG. 5, the discriminating unit 47 computes the T2/T1 ratio of the second time period information T2 output from the second clock unit 46 to the first time period information T1 output from the first clock unit 45 (S1). The discriminating unit 47 reads the table shown in FIG. 4 from the memory unit (S2), selects one of the types of optical disc media as a type of interest (S3), and reads an upper limit value H and a lower limit value L associated with the type of interest from the table (S4).

The discriminating unit 47 judges whether $H \geq T2/T1 > L$ (S5) and, when $H \geq T2/T1 > L$ is not satisfied, returns to Step S3 to repeat the step of selecting another type of optical disc medium not selected as the type of interest as a type of interest.

Meanwhile, if $H \geq T2/T1 > L$ is satisfied in Step S5, the optical disc medium is judged to be a medium specified by the type of interest at that time and information indicative of the type is output (S6).

Figure 3B:
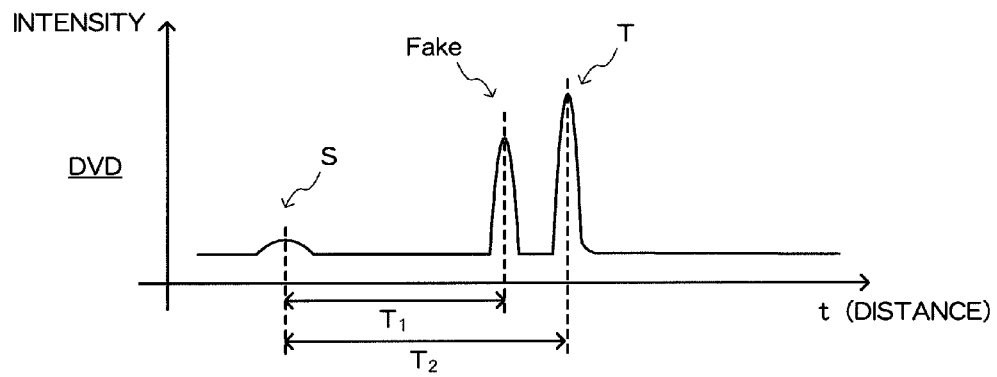
FIG. 3B is an explanatory diagram showing an example of a PI signal for a DVD detected by the optical disc device according to the embodiment of the present invention.
Figure 3C:
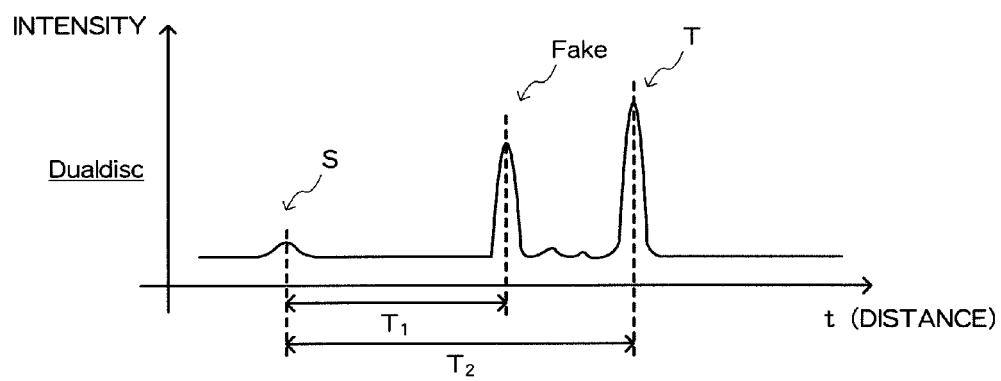
FIG. 3C is an explanatory diagram showing an example of a PI signal for a dual disc detected by the optical disc device according to the embodiment of the present invention.

FIGS. 3A, 3B, and 3C show examples of the PI signal for a CD, a dual disc, and a DVD. With reference to FIGS. 3A, 3B, and 3C, a determination example in the optical disc device of this embodiment will be explained below based on the actual measurement value. In the following description, it is supposed that the position where a fake signal is measured is a position 0.4 mm from the surface.

In a CD, a time T1 from surface reflection (S) to the measurement of a fake signal is 20 ms, and a time T2 from surface reflection (S) to the measurement of reflection by the signal surface is 61 ms. In this case, the thickness of the protective layer, that is, the distance from the surface to the signal surface is calculated as follows.

$$0.4 \times 61/20 = 1.22 \text{ mm}$$

In a DVD, the time T1 from surface reflection (S) to the measurement of a fake signal is 20 ms, and the time T2 from surface reflection (S) to the measurement of reflection by the signal surface is 32 ms. In this case, the thickness of the protective layer, that is, the distance from the surface to the signal surface, is calculated as follows.

$$0.4 \times 32/20 = 0.64 \text{ mm}$$

Further, in a dual disc, the time T1 from surface reflection (S) to the measurement of a fake signal is 20 ms, and the time T2 from surface reflection (S) to the measurement of reflection by the signal surface is 45 ms. In this case, the thickness of the protective layer, that is, the distance from the surface to the signal surface, is calculated as follows.

$$0.4 \times 45/20 = 0.89 \text{ mm}$$

In this embodiment, the distance from the surface to the signal surface can be measured not based on a change in feed rate but based on the detection position of a fake signal at a position where the detection position is not influenced by a change in feed rate even when the feed rate of the objective lens of the optical pickup 23 by the focus control actuator 25b is changed according to environmental conditions, thereby making it possible to improve the accuracy of discriminating the type of optical disc medium.

As a specific operation example of the optical disc device of this embodiment, the operation of discriminating a Blu-ray (Trademark) Disc (BD), a compact disc (CD), a DVD, and a dual disc will be described hereinunder.

Figure 6:
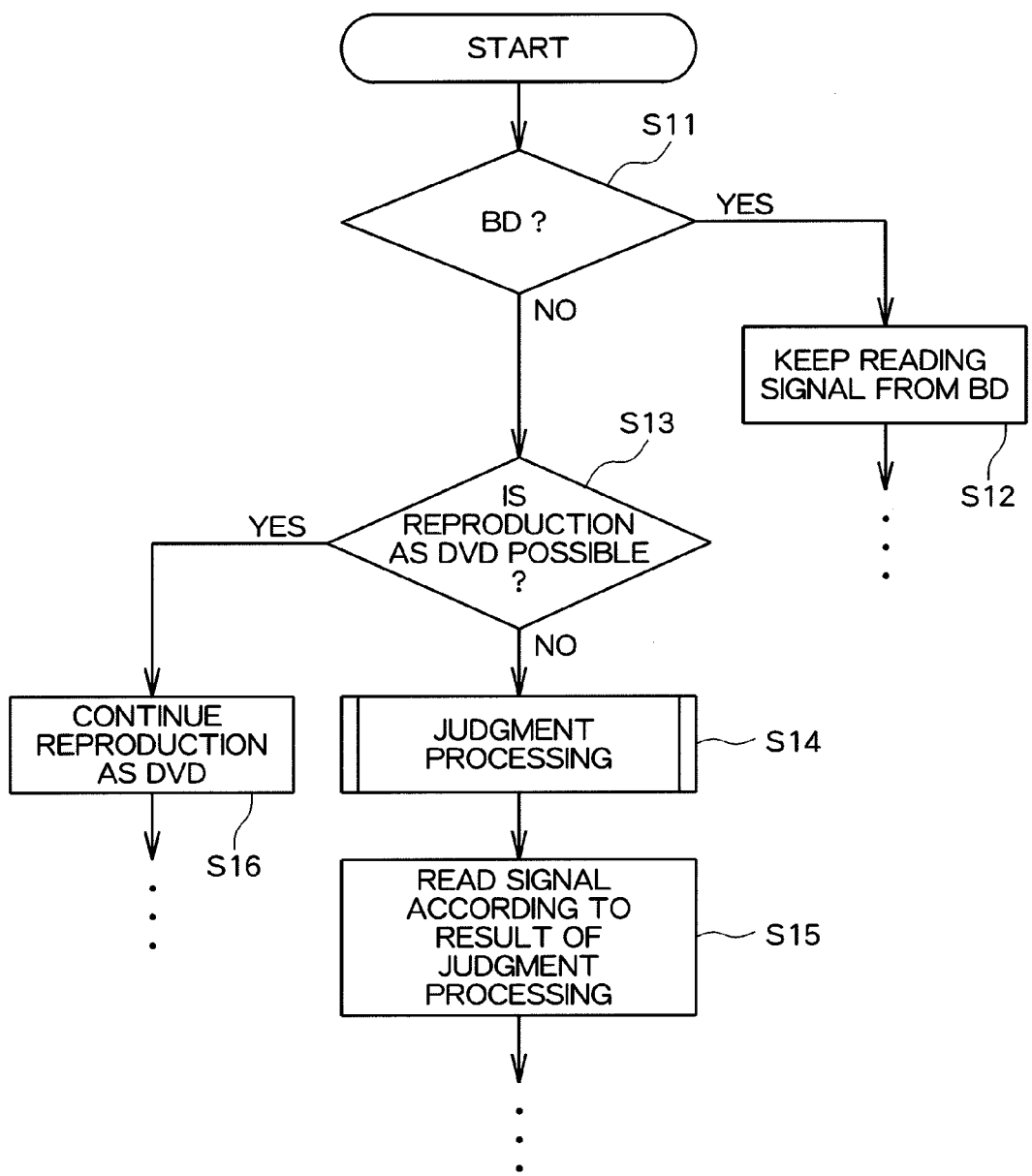
FIG. 6 is a flow chart showing an example of a processing flow for discriminating the type of optical disc medium carried out by the optical disc device according to the embodiment of the present invention.

In this embodiment, the optical disc device checks based on the type of an optical disc medium using a short-wavelength light source as shown in FIG. 6. That is, the optical disc device controls the optical pickup 23 to apply light having a wavelength (405 nm) for a BD to judge whether the optical disc medium is a BD or not (S11). When discriminating that the optical disc medium is a BD, the optical disc device keeps reading a signal or the like on the condition that the set optical disc medium is a BD.

If it is judged in Step S11 that the optical disc medium is not a BD, the optical disc device controls the optical pickup 23 to apply light having a wavelength (650 nm) for a DVD and tries to reproduce a DVD (S13). When the reproduction of the DVD fails, the optical disc device starts the processing shown in FIG. 5 and determines the type of the optical disc medium based on the time T1 between the instant when surface reflection is detected and the instant when the primary fake signal is detected, and the time T2 between the instant when the surface reflection is detected and the instant when reflection by the signal surface is detected while bringing the objective lens of the optical pickup 23 close to the set optical disc medium at substantially a constant speed from a predetermined distance (S14: discriminating step).

As a result of the processing, the optical disc device reads from the signal surface of the determined optical disc medium (S15). When the reproduction of the DVD succeeds in Step S13, the reproduction of the DVD is continued (S16).

In Step S13, it may be judged whether the optical disc medium is a DVD or a CD as in the prior art. In this case, when it is judged that the optical disc medium is a CD at this instant, a signal is read from the CD. When it is judged that the optical disc medium is a DVD, the reproduction of the DVD is tried. When the reproduction of the DVD succeeds, the reproduction of the DVD is continued. When the reproduction of the DVD fails, the step proceeds to S14 to continue processing. Further, in Step S11, when it is judged that the inserted optical disc medium is not a BD, the step may proceed to S14 directly. Step S13 is not always necessary.

While the present invention is described in terms of preferred or exemplary embodiments, it is not limited thereto.

What is claimed is:

1. An optical disc device for reading a signal recorded on an optical disc medium, comprising:
   an optical pickup which selectively applies light having one wavelength, out of a plurality of different wavelengths, to the optical disc medium through one objective lens, and which outputs a signal based on light reflected by the optical disc medium;
   a drive unit which moves the objective lens of the optical pickup relative to a surface of the optical disc medium; and
   a control unit which detects a signal based on surface reflection by the surface of the optical disc medium, a fake signal generated based on the surface reflection, and a signal based on light reflected by a data recording layer of the optical disc medium, while the objective lens is moved relative to the surface of the optical disc medium by the drive unit, and which discriminates a type of the optical disc medium based on a ratio of a first time period between an instant when the surface reflection is detected and an instant when the fake signal is detected, and a second time period between the instant when the surface reflection is detected and an instant when light reflected by the data recording layer is detected.

2. A control method for an optical disc device including: an optical pickup which selectively applies light having one wavelength, out of a plurality of different wavelengths, to the optical disc medium through one objective lens, and which outputs a signal based on light reflected by the optical disc medium; and a drive unit which moves the objective lens of the optical pickup relative to the surface of the optical disc medium,
   the method comprising:
   detecting a signal based on surface reflection by the surface of the optical disc medium, a fake signal generated based on the surface reflection, and a signal based on light reflected by a data recording layer of the optical disc medium, while the objective lens is moved relative to the surface of the optical disc medium by the drive unit;
   discriminating a type of the optical disc medium based on a ratio of a first time period between an instant when the surface reflection is detected and an instant when the fake signal is detected, and a second time period between the instant when the surface reflection is detected and an instant when light reflected by the data recording layer is detected; and
   outputting a result of the discriminating.

3. A non-transitory computer-readable recording medium storing a program for controlling an optical disc device including: an optical pickup which selectively applies light having one wavelength, out of a plurality of different wavelengths, to an optical disc medium through one objective lens, and which outputs a signal based on light reflected by the optical disc medium; and a drive unit which moves the objective lens of the optical pickup relative to a surface of the optical disc medium,
   the program causing the computer to execute:
   detecting a signal based on surface reflection by the surface of the optical disc medium, a fake signal generated based on the surface reflection, and a signal based on light reflected by a data recording layer of the optical disc medium, while the objective lens is moved relative to the surface of the optical disc medium by the drive unit;
   discriminating a type of the optical disc medium based on a ratio of a first time period between an instant when the surface reflection is detected and an instant when the fake signal is detected, and a second time period between the instant when the surface reflection is detected and an instant when light reflected by the data recording layer is detected; and
   outputting a result of the discriminating.

* * * * *